(12) United States Patent
Salisbury

(10) Patent No.: US 7,552,959 B2
(45) Date of Patent: Jun. 30, 2009

(54) MODULAR AND DETACHABLE FAIRING FOR A MOTORCYCLE

(76) Inventor: Rick M. Salisbury, 494 W. 1300 N., Springville, UT (US) 84663

( * ) Notice: Subject to any disclaimer, the term of this patent is extended or adjusted under 35 U.S.C. 154(b) by 17 days.

(21) Appl. No.: 10/563,788

(22) PCT Filed: Jul. 9, 2004

(86) PCT No.: PCT/US2004/022009

§ 371 (c)(1),
(2), (4) Date: Jul. 13, 2006

(87) PCT Pub. No.: WO2005/007496

PCT Pub. Date: Jan. 27, 2005

(65) Prior Publication Data

US 2007/0040407 A1    Feb. 22, 2007

(51) Int. Cl.
*B62J 17/00*    (2006.01)
(52) U.S. Cl. .................................... 296/78.1
(58) Field of Classification Search ............... 296/78.1, 296/180.1; 180/219
See application file for complete search history.

(56) References Cited

U.S. PATENT DOCUMENTS

| | | | | |
|---|---|---|---|---|
| 557,488 | A * | 3/1896 | Cherry | 296/78.1 |
| 597,298 | A * | 1/1898 | Ross | 296/78.1 |
| 600,010 | A * | 3/1898 | Miller | 296/78.1 |
| 1,042,305 | A * | 10/1912 | Wright | 296/78.1 |
| 1,188,105 | A * | 6/1916 | Schlegel | 296/78.1 |
| 1,239,916 | A * | 9/1917 | Jose | 296/78.1 |
| 1,729,086 | A * | 9/1929 | Premont | 296/78.1 |
| 2,237,594 | A * | 4/1941 | Dunlap | 296/78.1 |
| 2,903,297 | A * | 9/1959 | Zbikowski | 296/78.1 |
| 3,690,721 | A * | 9/1972 | Herbert et al. | 296/78.1 |
| 3,836,176 | A * | 9/1974 | Ylvisaker | 280/213 |
| 3,866,242 | A * | 2/1975 | Slagel | 2/2.5 |
| 4,023,853 | A * | 5/1977 | Oguma et al. | 296/78.1 |
| 4,132,994 | A * | 1/1979 | Caldwell | 343/713 |
| 4,166,650 | A | 9/1979 | Saunders, IV | |
| D281,359 | S * | 11/1985 | Ofield | D26/139 |
| 4,655,497 | A * | 4/1987 | Mallett | 296/78.1 |
| 4,686,656 | A | 8/1987 | Morishima | |
| 4,776,422 | A | 10/1988 | Sakuma | |
| 4,964,484 | A | 10/1990 | Buell | |
| 5,222,752 | A | 6/1993 | Hewitt | |
| 5,267,767 | A * | 12/1993 | Farrow | 296/78.1 |

(Continued)

*Primary Examiner*—Kiran B. Patel
(74) *Attorney, Agent, or Firm*—Thorpe North & Western LLP

(57) ABSTRACT

A method and apparatus for providing a modular fairing configured to attach to a front portion of a motorcycle. The modular fairing 110, 300 includes a fairing frame member 120, 301, multiple coupling portions and at least one flexible fairing cover portion 150, 304. The fairing frame member may include multiple support members 121, 302 operable to be removably coupled to each other to form the fairing frame member. The multiple coupling portions extend from the fairing frame member and are configured to removably couple the frame member to the front portion of the motorcycle. The at least one flexible fairing cover portion includes a face portion and an attachment portion and is operable to be removably attached to and at least partially cover the fairing frame member. With this arrangement, the fairing frame member is detachable from the front portion of the motorcycle and operable to be folded or reconfigured 310 into a smaller configuration 312 for storing.

14 Claims, 7 Drawing Sheets

U.S. PATENT DOCUMENTS

| | | |
|---|---|---|
| 5,330,029 A | 7/1994 | Yoshimura et al. |
| 5,529,365 A * | 6/1996 | Saunders .................... 296/78.1 |
| 5,658,035 A | 8/1997 | Armstrong |
| 5,855,404 A | 1/1999 | Saunders |
| 6,155,369 A * | 12/2000 | Whittaker ................... 180/220 |
| 6,176,538 B1 | 1/2001 | Lawson et al. |
| 6,203,093 B1 | 3/2001 | Suzuki et al. |
| 6,231,104 B1 * | 5/2001 | Roethel ...................... 296/78.1 |
| 2004/0051336 A1 * | 3/2004 | Chiao et al. ................ 296/78.1 |

* cited by examiner

MODULAR AND DETACHABLE FAIRING FOR A MOTORCYCLE

BACKGROUND OF THE INVENTION

1. Field of the Invention

The present invention relates generally to motorcycle components. More particularly, the present invention relates to a removable fairing for a motorcycle.

2. Related Art

Motorcycles are often provided with a fairing at the front portion of the motorcycle. Such a fairing is made to reduce wind resistance while driving the motorcycle and provide a different overall aesthetic appearance to the motorcycle. Fairings are typically non-removable and fixed to the frame of the motorcycle and typically include an inner panel and an outer panel. The inner panel typically accommodates various gauge members, such as a speedometer, an oil pressure meter and a temperature meter. The outer panel typically accommodates a head-light and generally may have a small panel that can be removed for servicing some of the components displayed on the inner panel.

For aesthetic purposes, there are many motorcycles that do not provide a fairing at the front portion of the motorcycle. However, these types of motorcycles will often include a windshield to help minimize fatigue during long distance highway travel caused from the wind on the exposed upper body of the biker while riding on the motorcycle. U.S. Pat. No. 5,658,035 to Armstrong, assigned to Harley-Davidson Motor Company, discloses a detachable windshield that can quickly be attached for long distance highway travel and detached from the motorcycle for lower speed street travel. Although such detachable windshield is favorable for long distance highway travel, the configuration of the detachable windshield is relatively narrow, thereby, still allowing large amounts of air flow against a biker's body to cause fatigue during long distance highway travel.

SUMMARY OF THE INVENTION

The present invention relates to a method and apparatus for providing a removable fairing configured to attach to a front portion of a motorcycle. The fairing includes a fairing frame member, multiple coupling portions, and at least one flexible fairing cover portion. The fairing frame member provides a rigid section that defines the shape for the fairing. The multiple coupling portions are positioned on the fairing frame member and are configured to removably couple the frame member to the front portion of the motorcycle. The at least one flexible fairing cover portion includes a face portion and an attachment portion and is operable to at least partially cover the fairing frame member. With this arrangement, the fairing frame member along with the flexible fairing cover is detachable from the front portion of the motorcycle and operable to be reconfigured into a smaller configuration for storing.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 2(a) illustrates an enlarged view of encircled section 2 in FIG. 2, depicting disassembled end portions of different components of the fairing frame member slidingly attachable and detachable with respect to each other and depicting a line member that can extend between the different components, according to another embodiment of the present invention;

FIG. 5(a) illustrates a partial perspective view of the modular fairing attached to the front portion of the motorcycle, depicting (in outline) upper and lower coupling portions coupled to fairing attachment portions;

FIG. 5(b) illustrates an enlarged perspective view of a fairing attachment portion taken from encircled section 5 in FIG. 5;

DETAILED DESCRIPTION

Figure 1:
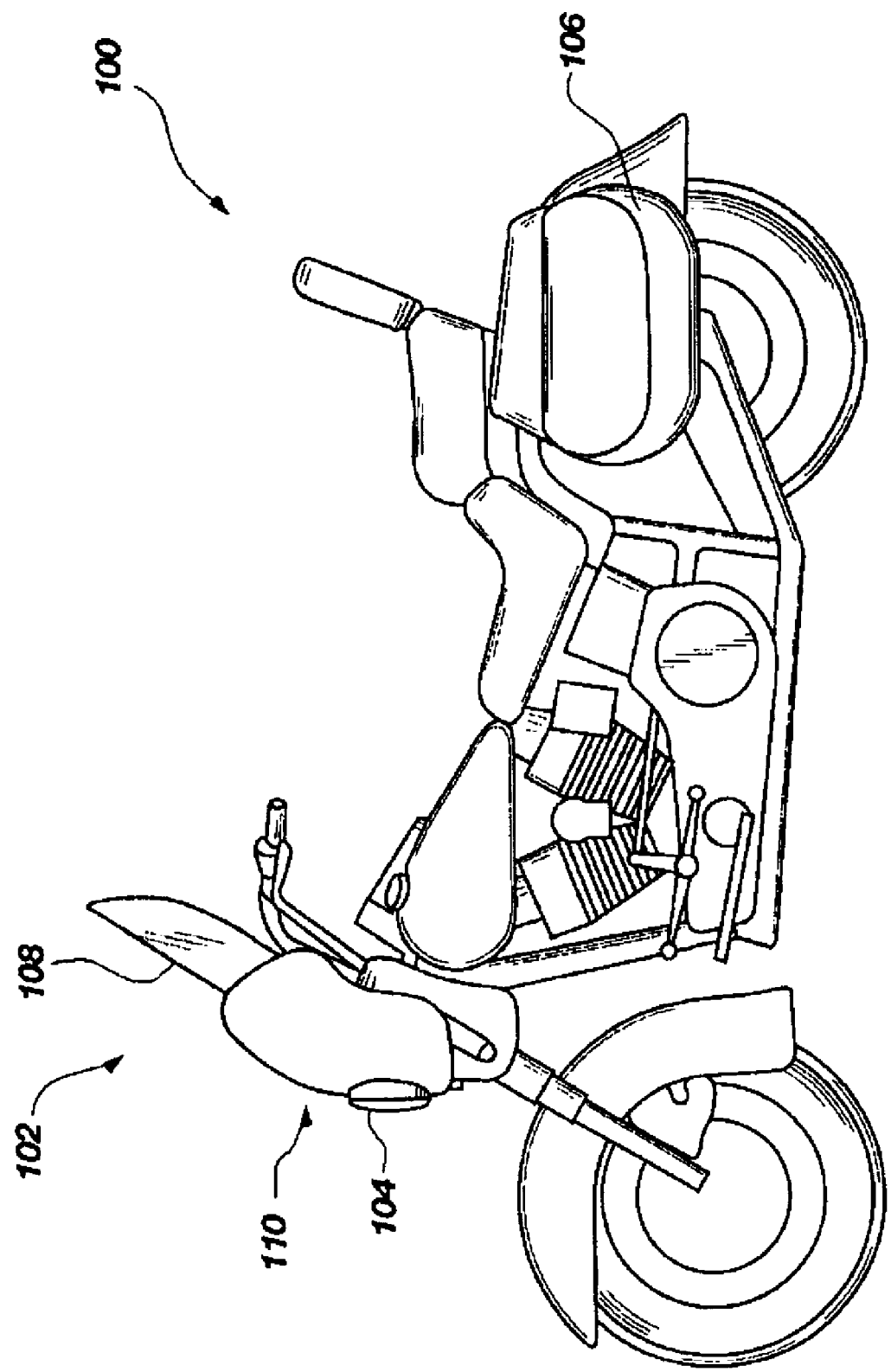
FIG. 1 illustrates a side, plan view of a motorcycle with a fairing attached to the front portion of the motorcycle.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
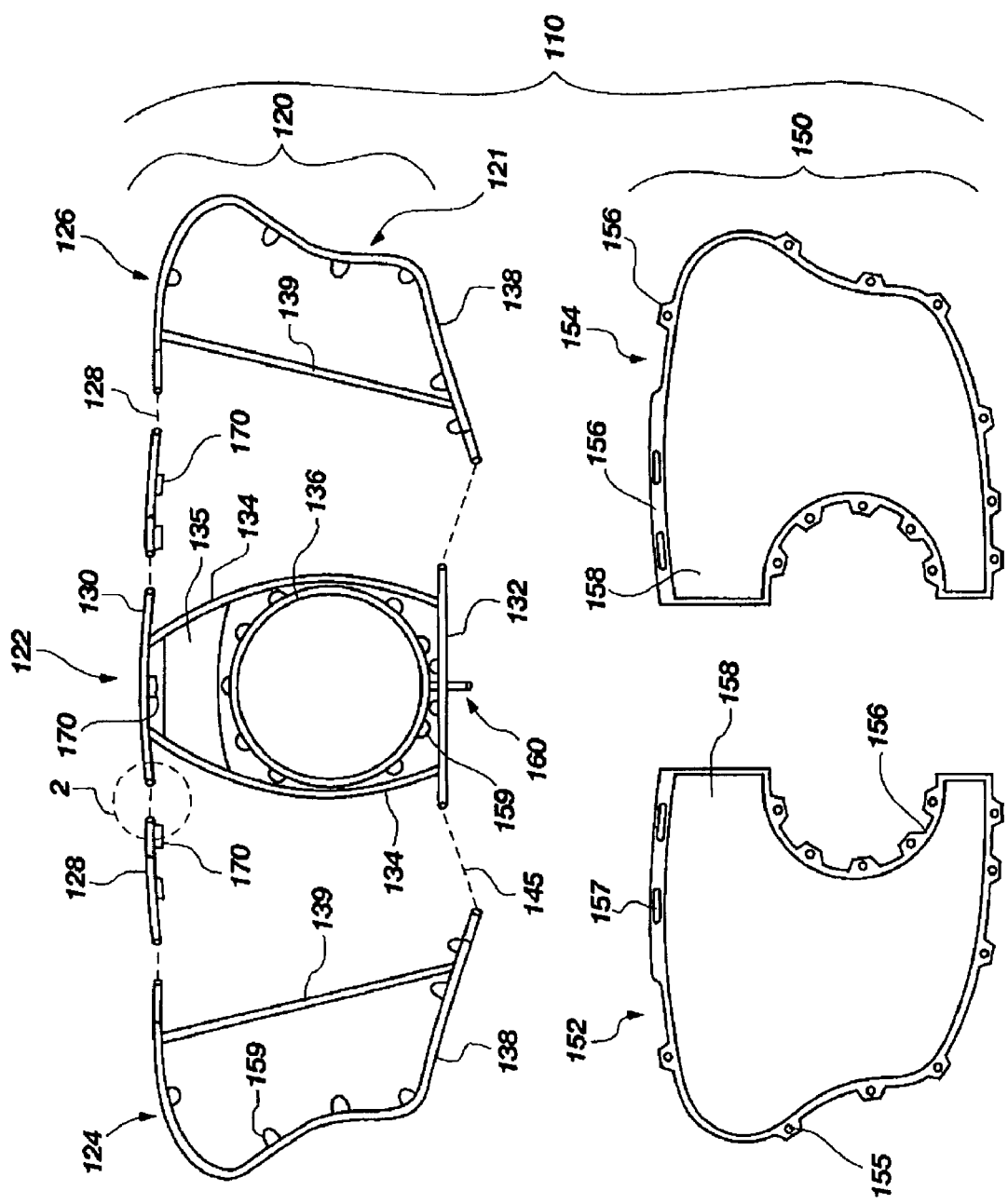
FIG. 2 illustrates an exploded perspective view of a modular fairing, depicting a disassembled fairing frame and first and second flexible cover portions, according to an embodiment of the present invention.

FIGS. 1 and 2 illustrate a removable fairing 110 configured to attach to a front portion 102 of a motorcycle 100. Such a motorcycle 100 can be any suitable type of motorcycle and preferably is of the type without a fixed fairing disposed at the front portion thereof. The removable fairing 110 can be mounted to a motorcycle 100 having a windshield 108, but is not so limited, as the windshield is not a necessary component for attaching the fairing 110 to the motorcycle 100.

The removable fairing 110 is configured to allow a biker to readily attach and detach the fairing 110 to and from the front portion 102 of the motorcycle 100 without the use of tools. The fairing 110 includes a modular configuration that facilitates quick and ready disassembly into smaller compact components as well as facilitates quick and ready assembly from such compact components to form the fairing 110. Such modular configuration allows the biker to store the smaller compact components in, for example, a saddle-bag 106 on the motorcycle 100. With this arrangement, a biker can readily interchange between riding with and without the fairing 110 as desired. Such versatility of the fairing makes for a useful component for motorcycle owners since often when traveling long distances at free-way speeds, the fairing 110 substantially breaks the air flow to the biker to substantially minimize fatigue during long distance highway travel. On the hand, the biker can, at any time desired, detach the fairing 110 and break-down or reconfigure the modular fairing 110 into a smaller configuration for storing with the motorcycle 100 during lower speed street travel.

Such a fairing 110 includes a fairing frame member 120 to at least partially define the shape of the fairing and a fairing cover 150 sized and configured to be at least partially wrapped around the fairing frame member 120. In this case the fairing frame member 120 is comprised of multiple modular support members 121 which are sized and configured to be coupled together for ready assembly as well as decoupled for disassembly. The multiple support members create a skeletal outline of the fairing frame member 120 when assembled. The fairing frame member 120 also includes, but is not limited to, lower and upper coupling portions 160 and 170 extending from the fairing frame member 120. Such coupling portions can be fixed to the fairing frame member 120 by any suitable fastening means, such as by welding and/or a fastener type arrangement. The lower and upper coupling portions 160 and 170 are configured to facilitate attachment of the fairing 110 to the front portion 102 of the motorcycle 100. Such coupling portions can be positioned and located on the fairing frame member 120 at any suitable location, depending upon the configuration of the front portion 102 of the motorcycle 100 to facilitate attachment thereto. Otherwise said, there are many types of motorcycles with various types of configurations in which the position and location of the coupling portions can vary depending upon the configuration of the front portion of the motorcycle to which the fairing 110 is to attach.

With respect to FIG. 2, in one embodiment, the fairing frame member 120 can be formed of multiple support members including, for example, a middle portion 122, first and second side portions 124 and 126 and intermediate portions 128. The support-members can each be formed at least partially from shafts or rods having a tubular and/or solid cross-section. The middle portion 122 can include a top member 130 and a bottom member 132 with two middle extensions 134 extending laterally between the top member 130 and bottom member 132 and fixedly coupled therebetween. The middle portion 122 can also include a circular member 136 and a support shield 135 each disposed between the two middle extensions 134. The circular member 136 is sized and configured to be disposed around a head-light 104 at the front portion 102 of the motorcycle 100 (FIG. 1). The support shield 135 can be positioned above the circular member 136 between the middle extensions 134 to provide additional support for the fairing cover 150.

The first and second side portions 124 and 126 can each include a peripheral side member 138 extending in a generally U-shaped configuration. The peripheral side member 138 can include various contours and bows depending on the aesthetic configuration desired. Each of the first and second side portions 124 and 126 can include one or more extension members 139 fixedly coupled and extending laterally between opposing portions of the U-shaped peripheral side member 138. The intermediate portions 128 can include, but is not limited to, a length with a slight curvature.

With this arrangement, the intermediate portions 128 can be configured to be coupled between each end of the top member 138 of the middle portion 122 and an upper end portion of the peripheral side members 138 of the respective first and second side portions 124 and 126. Each end of the bottom member 132 of the middle portion 122 can be configured to couple to a lower end portion of the peripheral side members 138 of the respective first and second side portions 124 and 126. As such, each of the middle portion 122, intermediate portions 128 and the first and second side portions 124 and 126 can be coupled together to form the fairing frame member 120. The fairing frame member 120 can be formed from any suitable material as known to one of ordinary skill in the art, such as, steel, brass, copper, aluminum, and/or alloys thereof, or composite materials, or any other suitable material, such as fiberglass, graphite and/or high-strength polymeric-type material.

With respect to FIGS. 2 and 2(a), as previously set forth, the various support members can be at least partially formed with a tubular configuration so that each of the support members can be coupled together in a telescopic or mating arrangement. For example, a top end portion 142 of the top member 130 of the middle portion 122 and an intermediate end portion 146 of one of the intermediate portions 128 can be separated and re-joined in a mating arrangement as indicated by arrows 147 and 149. More specifically, the top end portion 142 can include an insert portion 144 with an outer diameter that can be slidingly positioned within and removed from a tubular opening 148 of the intermediate end portion 146. In this manner, the tubular opening 148 defined by the intermediate end portion 146 can receive the insert portion 144 to secure the intermediate end portion 128 and the top member 130 with an interference type fit as well as be slidingly separated to disassemble the fairing frame member 120. Likewise, a similar arrangement can be implemented at corresponding end portions of each of the intermediate portions 128, the middle portion 122 and the first and second side portions 124 and 126 to facilitate ready disassembly and assembly of the fairing frame member 120.

In one embodiment, one or more line members 145 having an elasticity characteristic can extend at least partially along a longitudinal length through an inside of the tubular configuration of each of the first and second side portions 124 and 126, the intermediate portions 128 and the middle portion 122. Such one or more line members 145 can be operable to maintain the components of the fairing frame member 120 in their ordered position when the fairing frame member 120 is disassembled and placed into storage. Further, the one or more line members 145 prevent losing the disassembled components as well as facilitate ready assembly of the fairing frame member 120.

Figure 3:
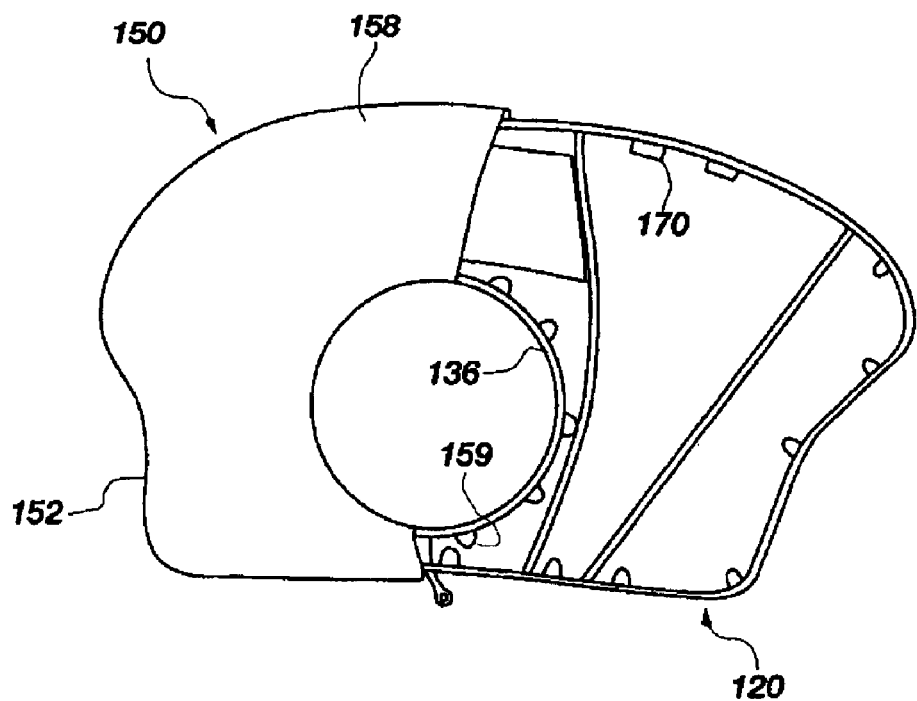
FIG. 3 illustrates a perspective front view of a partially assembled modular fairing, depicting the fairing frame assembled with one of the flexible cover portions attached to the fairing frame.
Figure 4:
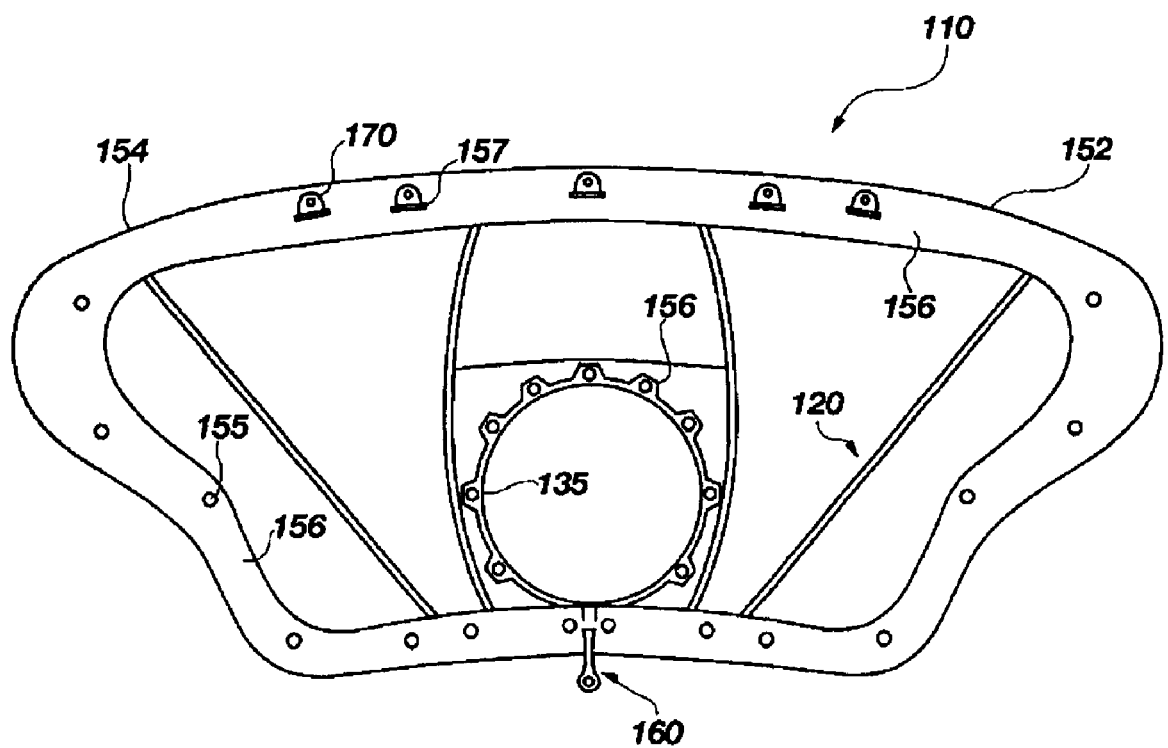
FIG. 4 illustrates a perspective rear view of an assembled modular fairing, depicting upper coupling portions partially exposed at an upper portion of the modular fairing and depicting the lower coupling portion exposed below a bottom portion of the modular fairing.

Referring now to FIGS. 2, 3 and 4, the various support members can be assembled together at their respective end portions, as previously described with respect to FIG. 2(a), to form the fairing frame member 120, after which, the fairing cover 150 can be attached thereto. The fairing cover 150 is sized and configured to at least partially attach to and/or wrap around the fairing frame member 120. The fairing cover 150 is formed of a flexible material and is configured to facilitate easy attachment to and removal from the fairing frame member 120. The fairing cover 150 can include a first and second cover portion 152 and 154 each including attachment portions 156 and a face surface 158. Such a fairing cover 150 can be formed from any suitable flexible material, such as, canvas, vinyl, polymeric blends, leather, synthetic leather and any other suitable material known to one of ordinary skill in the art.

The first and second cover portions 152 and 154 can be sized and configured so that the attachment portions 156 wrap around a periphery of the fairing frame member 120 and around respective sides of an inside periphery of the circular member 136. As such, the first and second cover portions 152 and 154 are attached to the fairing frame member 120 with the face surface 158 facing outward with respect to the front portion of the motorcycle (not shown). The attachment portions 156 can include a means for attaching to the frame member, such as snaps 155 sized and configured to attach to tabs 159 extending from the fairing frame member 120. Such snaps 155 can be positioned along the periphery of each of the first and second cover portions 152 and 154 so that the snaps 155 formed in the attachment portions 156 wrap around the periphery of the frame member 120 and attach to the tabs 159. Other suitable attachment means can also be employed for the attachment portions 156, such as straps, releasable loops, Velcro or any other suitable attachment means known to one of ordinary skill in the art that allows ready attachment and removal of the first and second cover portions 152 and 154 with respect to the fairing frame member 120.

The attachment portions 156 can also include slots 157 extending therethrough positioned at upper portions of the first and second cover portions 152 and 154. Such slots 157 can be positioned and configured to receive the upper coupling portions 170 extending from an upper portion of the fairing frame member 120. With this arrangement, the upper coupling portions 170 extend through the slots 157 in an exposed manner to couple to the front portion of the motorcycle (not shown).

Figure 5:
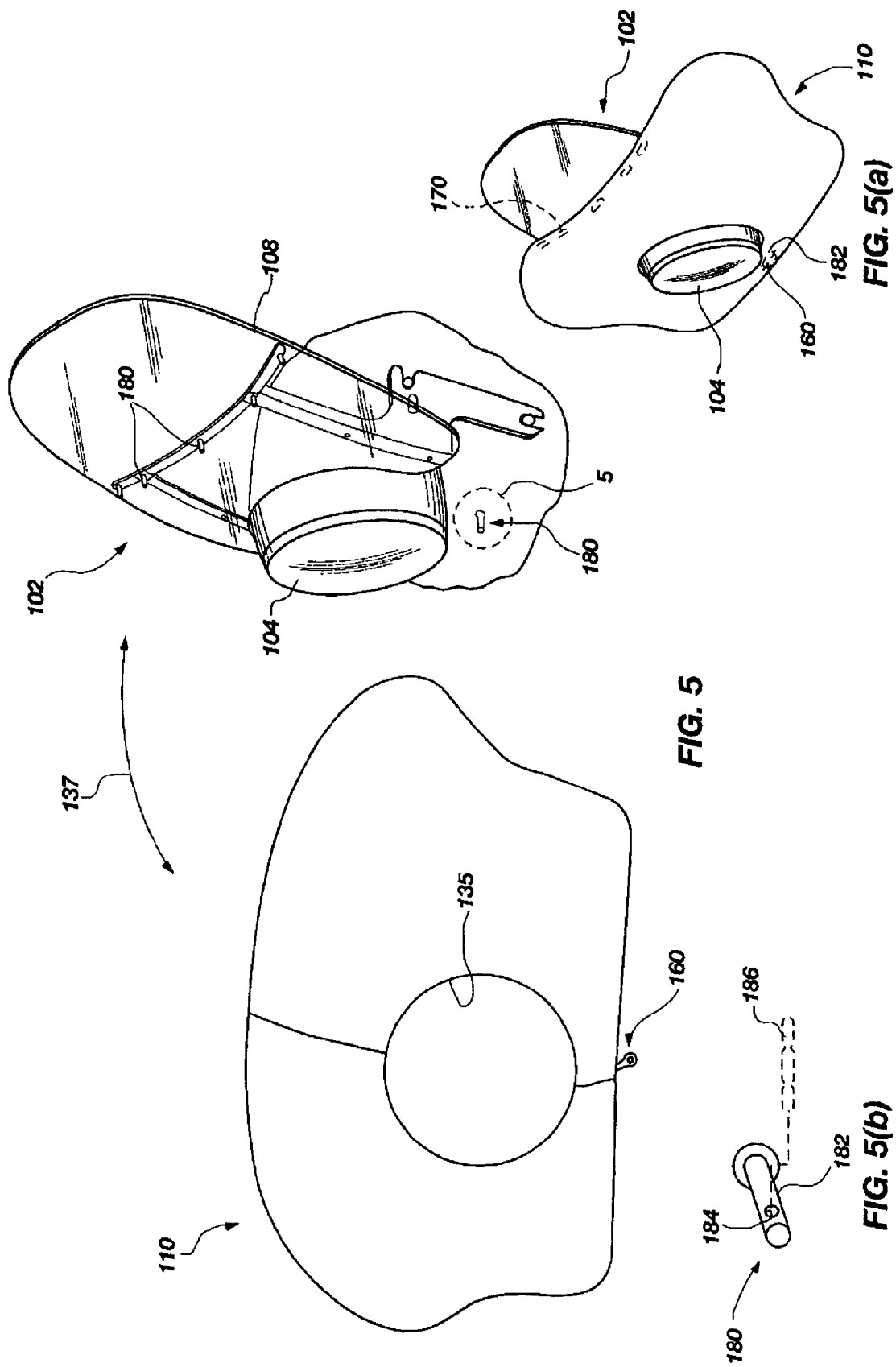
FIG. 5 illustrates a perspective view of the assembled modular fairing and a front portion of a motorcycle, depicting the modular fairing being attachable to and removable from the front portion of the motorcycle.

Referring to FIGS. 4, 5 and 5(a), the assembled modular fairing 110 can be readily attached and detached from the front portion 102 of the motorcycle 100, as indicated by bi-directional arrow 137. The circular member 136 (FIG. 3) defined in the frame member 120 provides an opening 135 in the modular fairing 110 sized and configured to be disposed around the head-light 104 of the motorcycle 100. The front portion 102 of the motorcycle 100 can include fairing attachment portions 180 configured to couple with the lower coupling portion 160 and the upper coupling portions 170 extending from the fairing frame member 120. Such fairing attachment portions 180 can be positioned at any suitable location on the front portion 102 of the motorcycle 100 as such locations for the fairing attachment portions 180 will vary with differently configured and types of motorcycles. For example, the fairing attachment portions 180 can be configured to be secured to portions of a windshield 108 for coupling to the upper coupling portions 170 of the fairing frame member 120. Likewise, a fairing attachment portion 180 can be positioned and secured below the head-light 104 for coupling to the lower coupling portion 160 of the fairing frame member 120.

Referring to FIG. 5(b), as previously set forth, the fairing attachment portion 180 can extend from any suitable location at the front portion of the motorcycle to facilitate attachment of the fairing thereto. The fairing attachment portion 180 can include a post member 182 with a pin opening 184 defined therein extending transversely through the post member 182. Such a pin opening 184 can be configured to receive a pin 186. The pin 186 can include a configuration so as to allow manual insertion and removal of the pin 186 through the pin opening 184 to lock and secure either the lower or upper coupling portions (not shown) to the fairing attachment portion 180. The pin 186 employed for the fairing attachment portion 180 can be any suitable pin configuration, such as a post pin, cotter pin, or any other suitable pin configuration known to one of ordinary skill in the art.

Figure 6:
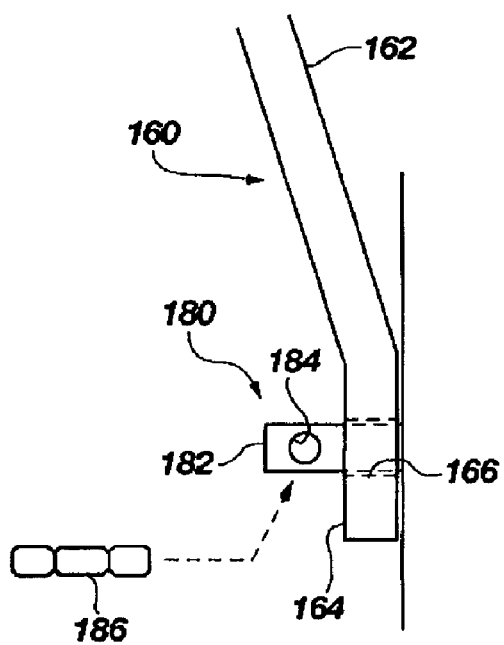
FIG. 6 illustrates a side view of the lower coupling portion coupled to a fairing attachment portion, according to an embodiment of the present invention.
Figure 7:
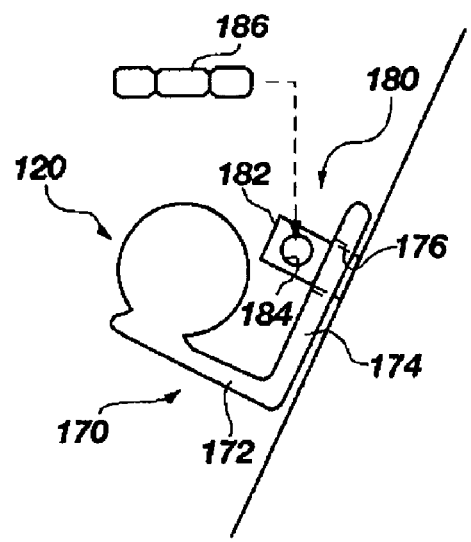
FIG. 7 illustrates a side view of the upper coupling portion coupled to a fairing attachment portion, according to another embodiment of the present invention.

Referring now to FIGS. 6 and 7, the lower and upper coupling portions 160 and 170 extending from the fairing frame member 120 can readily attach to and detach from fairing attachment portions 180. In particular, with respect to FIG. 6, the lower coupling portion 160 can extend from the bottom member 132 of the middle portion 122 of the fairing frame member 120 (FIG. 2). The lower coupling portion 160 can include an arm member 162 with a hand member 164 extending from the arm member 162. The arm member 162 is configured to extend toward the post member 182 of one of the fairing attachment portions 180. The hand member 164 can include a coupling opening 166 extending transversely therethrough and configured to receive the post member 182 therethrough. The pin 186 can then be manually inserted through the pin opening 184 to secure the lower coupling portion 160 to the fairing attachment portion 180.

With respect to FIG. 7, the upper coupling portions 170 can include an L-shaped bracket configuration with a first portion 172 fixed to the fairing frame member 120 and a second portion 174 extending freely from the first portion 172. The second portion 174 can include a coupling opening 176 extending transversely therethrough and configured to receive the post member 182 of one of the fairing attachment portions 180. Once the post member 182 is inserted through the coupling opening 176, the pin 186 can be inserted through the pin opening 184 to secure the upper coupling portion 170 to the fairing attachment portion 180. In this manner, with respect to FIGS. 5(a), 6 and 7, the lower and upper coupling portions 160 and 170 can be locked and secured to the fairing attachment portions 180 to attach the fairing 110 to the front portion 102 of the motorcycle. Likewise, detaching the fairing 110 from the motorcycle can be readily employed by removing the pins 186 from each of the fairing attachment portions 180. As such, attachment and detachment of the modular fairing 110 can be readily employed manually in a quick manner without the use of tools.

Figure 8:
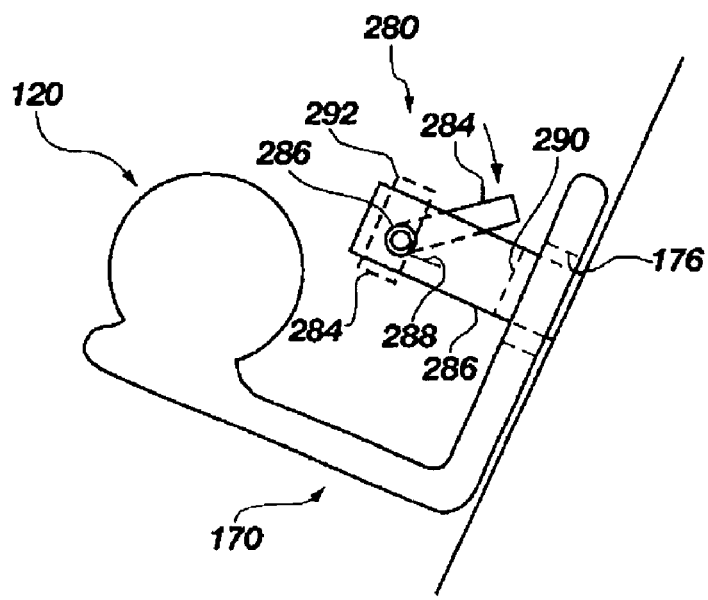
FIG. 8 illustrates a side view of another embodiment of a fairing attachment portion, depicting the upper coupling portion coupled to the fairing attachment portion.

With respect to FIG. 8, in another embodiment, the fairing attachment portion 280 can include a post member 282 having an internally coupled pin 284 disposed therein. In this embodiment, the pin 284 can be rotatably coupled to a shaft 286 with a spring 288 biasing the pin 284 in an upward position through a slot 290 defined in the post member 282. The pin 284 can be pushed downward into the slot 290, as indicated by arrow 296, to allow the post member 282 to be inserted into the coupling opening 176 of the upper coupling portion 170 to attach and secure the upper coupling portion 170 to the fairing attachment portion 280. Likewise, when detaching the fairing 110 from the front portion of the motorcycle (not shown), the pin 284 can be held into the slot 290 by manually moving a sleeve member 292 over such pin 290 as indicated by bidirectional arrow 294 to thereby, allow ready removal of the upper coupling portion 170 from the post member 282. Such a fairing attachment portion 280 can be similarly utilized with the lower coupling portion (not shown).

Figure 9A:
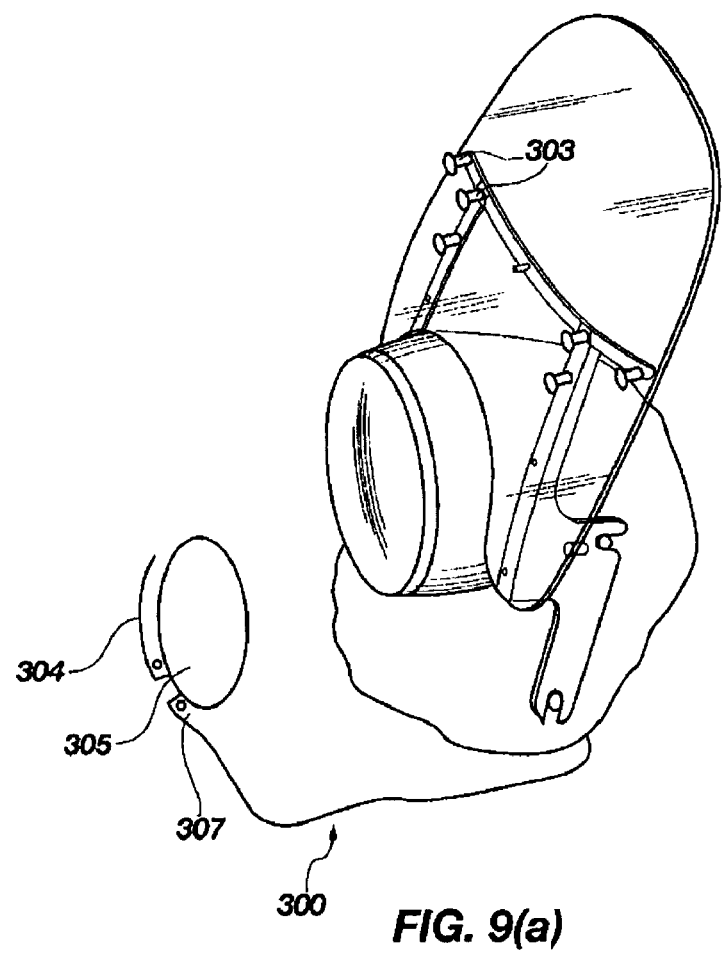
FIG. 9(a) illustrates the fairing of FIG. 9, depicting the fairing being attachable to and removable from the front portion of the motorcycle.
Figure 9:
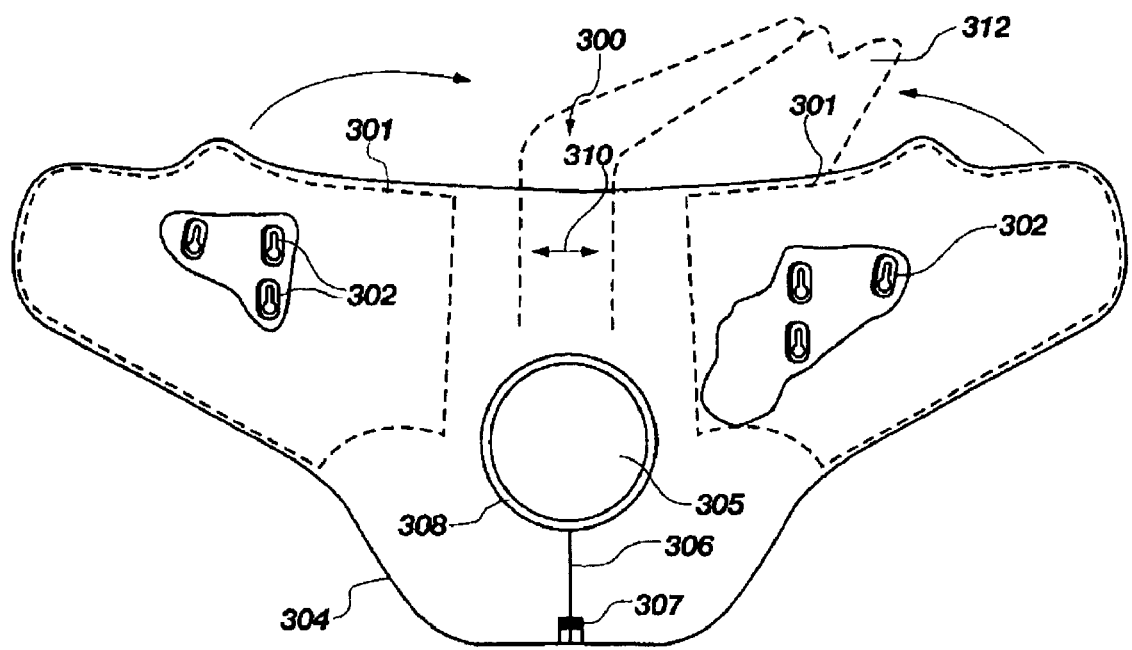
FIG. 9 illustrates a fairing in accordance with an alternative, embodiment to the present invention.

FIG. 9 illustrates a fairing configured to attach to a front portion of a motorcycle fairing 300 in accordance with an alternative embodiment of the present invention. The fairing frame member 301 (shown by dotted lines) at least partially defines the shape of the fairing. The fairing frame member 301 is currently constructed from a hard plastic substance, but may be made from any moderately durable and rigid material.

Multiple coupling portions 302 are positioned on the fairing frame member. In this embodiment the coupling portions use a common technique wherein pins with a larger head portion shown by 303 in FIG. 9(a) are configured to insert into the coupling portions 302 on the fairing frame member and lock into place by sliding the fairing 300 downward with respect to the pins 303.

The at least one flexible fairing cover portion 304 covers the fairing frame member everywhere except where the coupling portions 302 are located. The fairing cover portion 304 has a circular opening 305 to fit around a motorcycle headlight when attached. As in the previous embodiments the fairing cover can be formed from any suitable flexible material, such as, canvas, vinyl, polymeric blends, leather, synthetic leather and any other suitable material known to one of ordinary skill in the art.

In this embodiment the fairing cover need not be continuous below the circular opening. Leaving this portion open allows for some ease in attaching the fairing around the headlight. Once the fairing is wrapped around the headlight this open portion may be fastened together by a button/snap 307, releasable loop such as Velcro® 306, or any other attachment means. Also, an elastic portion 308 may surround the circular opening 305. The elastic portion 308 could be used whether the fairing cover 304 is or is not continuous below the circular opening 305. While none of these features are necessary, all of them could help accommodate various headlight shapes and sizes.

After the fairing frame member 301, along with the flexible fairing cover 304, is detached from the front portion of the motorcycle, it can be reconfigured into a smaller configuration for storage. Note in FIG. 9 that the rigid section of the fairing frame member 301 terminates before reaching the hole opening 305. This allows the flexible fairing cover 304 to fold about a preferential fold region 310 and thus achieve a smaller configuration 312.

Figure 10:
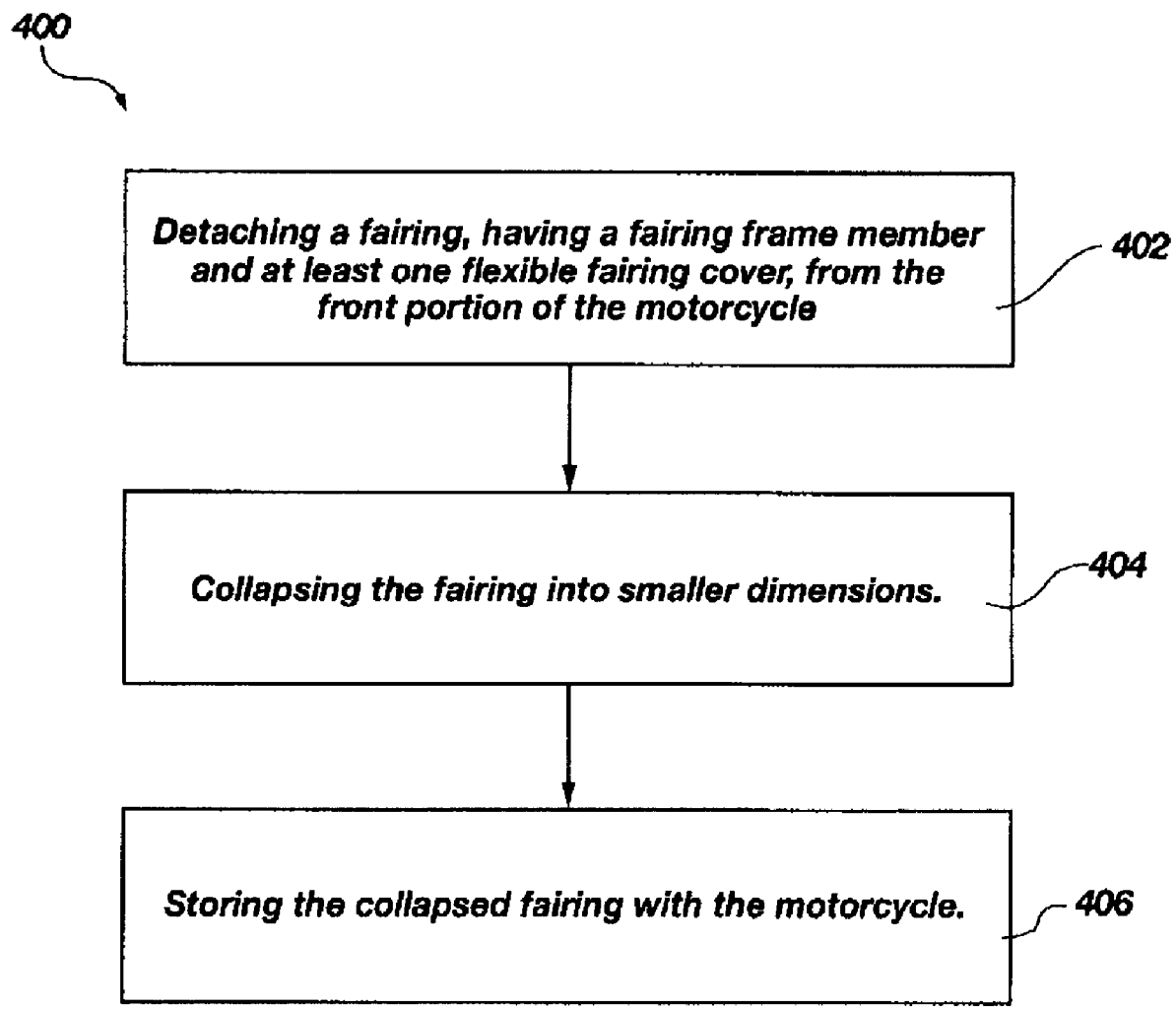
FIG. 10 illustrates a method for removable use of a fairing about a motorcycle.

Another embodiment of the present invention is shown in FIG. 10, which illustrates a method 400 for removable use of a fairing at the front portion of a motorcycle to store with the motorcycle. This method includes the steps of detaching 402 a fairing, having a fairing frame member and at least one flexible fairing cover, from the front portion of the motorcycle, collapsing 404 the fairing into smaller dimensions, and storing 406 the collapsed fairing with the motorcycle.

It should be noted that the fairing of the present invention could include various configurations depending on the configuration of the front portion of the motorcycle. For example, some motorcycles may include a primary head-light with smaller head-lights disposed at each side of the primary headlight. As such, the modular fairing of the present invention can be adapted to be formed and configured to correspond with most any head-light configuration at the front portion of the motorcycle.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A fairing configured to attach to a front portion of a motorcycle, the fairing comprising:
   a self supporting modular fairing frame member comprising multiple support members that slidably mate end-to-end to comprise a common longitudinal axis upon interconnection, to at least partially define a shape for the fairing;
   multiple coupling portions positioned on the fairing frame member and configured to removably couple the frame member to the front portion of the motorcycle; and
   at least one flexible fairing cover portion configured for attachment to and at least partially covering the fairing frame member;
   wherein said fairing frame member and flexible fairing cover are detachable from the front portion of the motorcycle and operable to be reconfigured, without tools, into a smaller configuration for storage.

2. The fairing of claim 1, wherein the fairing frame member includes multiple support members operable to be removably coupled to each other to form the fairing frame member.

3. The fairing of claim 1, wherein the fairing frame member and at least one flexible cover includes a modular configuration that facilitates quick assembly/disassembly into smaller components.

4. The fairing of claim 1, wherein the fairing frame member includes upper and lower coupling portions extending from the frame member that are configured to facilitate attachment of the fairing to the motorcycle.

5. The fairing of claim 1, wherein the fairing frame member further comprises a middle portion, first and second side portions, and intermediate portions to define the shape of the fairing.

6. The fairing of claim 5, wherein the multiple support members are at least partially formed with a tubular formation and can be coupled together in a telescopic/mating arrangement.

7. The fairing of claim 1, wherein the flexible fairing cover is formed of a material selected from a group consisting of canvas, vinyl, polymeric blends, leather, and synthetic leather.

8. The fairing of claim 1, wherein the flexible fairing cover may removably couple to the fairing frame member using an attachment means selected from a list consisting of snaps, releasable loops, and straps.

9. The fairing of claim 1, wherein the flexible fairing cover has an opening configured to fit around a headlight on the front of the motorcycle.

10. The fairing cover of claim 9, wherein the opening is lined with an elastic material to fit various shapes and sizes of headlights.

11. The fairing of claim 1, wherein the fairing is configured to attach to the front portion of a windshield.

12. The fairing of claim 1, wherein the fairing frame member is formed with a durable and rigid skeletal member.

13. The fairing frame member of claim 12, wherein the skeletal member is made of plastic material.

14. The fairing of claim 1, further comprising a preferential fold region within the cover portion for reconfiguration of the fairing into the smaller configuration by folding the flexible cover while it contains the frame member.

* * * * *